United States Patent [19]
Hasegawa

[11] Patent Number: 4,913,528
[45] Date of Patent: Apr. 3, 1990

[54] OPTICAL PRISM, AND PROJECTION TELEVISION SET USING SAME

[75] Inventor: Shinichi Hasegawa, Tokyo, Japan

[73] Assignee: Pioneer Electronic Corporation, Tokyo, Japan

[21] Appl. No.: 200,271

[22] Filed: May 31, 1988

[30] Foreign Application Priority Data

May 30, 1987 [JP] Japan ................................. 62-135414

[51] Int. Cl.4 .......................... G02B 5/04; G02B 5/06; H04N 9/31
[52] U.S. Cl. .................................... 350/286; 350/173; 358/60; 353/33
[58] Field of Search ....................... 358/60, 64, 55, 61, 358/62; 350/173, 286, 397, 401, 404; 353/31, 33, 38

[56] References Cited

U.S. PATENT DOCUMENTS

| Re. 30,513 | 2/1981 | Bleukens et al. | 350/173 X |
|---|---|---|---|
| 3,202,039 | 8/1965 | De Lang et al. | 350/173 |
| 3,610,818 | 10/1971 | Bachmann | 350/173 X |
| 3,659,918 | 5/1972 | Tan | 350/173 X |
| 3,659,927 | 5/1972 | Moultrie | 350/286 X |
| 3,739,080 | 6/1973 | Bachmann | 350/173 |
| 3,922,069 | 11/1975 | Kishikawa et al. | 350/173 |
| 4,009,941 | 3/1977 | Verdijk et al. | 350/173 |
| 4,027,328 | 5/1977 | Lessman | 358/60 X |
| 4,151,554 | 4/1979 | Tucker | 358/60 |
| 4,163,990 | 8/1979 | Hodges | 358/60 X |
| 4,268,119 | 5/1981 | Hartmann | 350/173 |

FOREIGN PATENT DOCUMENTS

| 58-222687 | 12/1983 | Japan | 358/60 |
|---|---|---|---|
| 59-28785 | 2/1984 | Japan | 358/60 |

Primary Examiner—Howard W. Britton
Assistant Examiner—Mark R. Powell
Attorney, Agent, or Firm—Sughrue, Mion, Zinn, Macpeak & Seas

[57] ABSTRACT

A prism system is disclosed which employs at least one solid or liquid filled prism element optically coupled to at least one plate like member which forms a total reflection surface or a dichroic mirror. In one embodiment the prism is molded from transparent plastic, e.g., PMMA or polystyrene, and in another embodiment the prism is molded from glass. In the case where a liquid is used, the liquid may be glycerol or a mixture of glycerol and ethyleneglycol. The prism is useful for a projection television set.

17 Claims, 3 Drawing Sheets

OPTICAL PRISM, AND PROJECTION TELEVISION SET USING SAME

BACKGROUND OF THE INVENTION

This invention relates to an optical prism and particularly to a trichromatic composition prism suitable for formation in an extremely large size for use in a projection TV (television) set, and to a projection TV set using the prism.

One example of a trichromatic resolution optical prism employed in a video camera is as shown in FIG. 3. Such prism is of course much smaller than that of the invention.

In FIG. 3, reference numeral 1 designates a convex lens for converging incident light beams; 2, 3 and 4, color resolving prisms; 5, a first dichroic mirror for transmitting red light and green light, and reflecting blue light; 6, a second dichroic mirror for transmitting green light and reflecting red light; 7 and 8, first and second total reflection surfaces for reflecting light of all colors; 9, an air gap between the first dichroic mirror and the second total reflection surface; 10, a blue image-forming surface; 11, a green image-forming surface; and 12, a red image-forming surface.

The operation of the optical prism thus constructed will be described. Light applied to the convex lens 1 from the left enters the prism 2 through the first total reflection surface 7 and reaches the first dichroic mirror 5, where light beams corresponding in wavelength to a blue component in the spectrum are reflected while the others are transmitted. The blue light reflected by the first dichroic mirror 5 is applied to the first total reflection surface 7 at more than the critical angle, where it is fully reflected to reach the blue image-forming surface 10. The light beams passed through the first dichroic mirror 5 enter the prism 3 and reach the second dichroic mirror 6, where only light corresponding to a red component is reflected. The light beam thus reflected is totally reflected by the second total reflection surface 8, thus reaching the red image-forming surface 12. The light beam passed through the second dichroic mirror 6 enters the prism 4 and reaches the green image-forming surface 1. The gap 9 is an air layer cooperating with the second total reflection surface 8 to permit said total reflection. The optical paths of the light beams in the prisms are made equal in length to one another so that the beams are equal in transmission time.

FIG. 4 shows one example of a conventional trichromatic composition technique for a projection TV set in which dichroic mirrors are so arranged as to form 45° angles with the optical axes. In FIG. 4, reference number 41 designates a compensating lens for gathering and radiating red, blue and green light; 42, a dichroic mirror having a dichroic film which reflects red light and transmits green and blue light; and 43, a dichroic mirror having a dichroic film which reflects blue light and transmits red and green light. The dichroic mirrors 42 and 43 are so arranged as to form 45° angles with the optical axes. The lens 41 is arranged in one of the four spaces defined by the two dichroic mirrors 42 and 43, and convex lenses 44, 45 and 46 and red, green and blue electron guns (not shown) are arranged in the remaining three spaces, respectively.

Red light emitted from the red electron gun passes through the convex lens 44 and is then reflected by the dichroic mirror 43. Blue light emitted from the blue electron gun, after passing through the convex lens 46, is reflected by the dichroic mirror 42. Green light emitted from the green electron gun passes through the dichroic mirrors 42 and 43. Thus, all of the red, blue and green light beams reach the lens 41. Thereafter, these light beams are projected onto a large screen (not shown) through a lens group (not shown) arranged behind the lens 41. As is apparent from the above description, the optical axes of the red, blue and green light beams are coincident with one another after passing through the lens 41. Because of this coincidence of the optical axes, the above-described method is advantageous in permitting electrical adjustments such as convergence adjustment or image distortion adjustment or optical adjustments such as color shift adjustment when compared with a method in which the light beams are allowed to reach the screen through respective lens groups. In addition, for the same reason, the screen can be designed with ease.

In the case where the dichroic mirrors are crossed as described above, an important factor is the transmissivity of the dichroic film which serves as an optical filter. In FIG. 5, the dotted lines indicate the radiation energy distributions of the ordinary blue, green and red electron guns with respect to optical wavelengths, and the solid lines indicate how the transmissivities of the dichroic mirror vary with the incident angle of the blue light beam thereto As is apparent from the graphical representation of FIG. 5, the smaller the incident angle, the more positively the blue light beam can be blocked. In FIG. 4, given the positioning the optical axis of the blue light beam, the incident angle to the dichroic mirror 42 is 45°. If the incident angle is decreased to 25°, then the blue light beam can be substantially reflected. If the incident angle is increased to 60°, then the blue light beam is passed through; that is, the dichroic mirror is not satisfactory in performance in this case. In FIG. 5, for the incident angle of 60°, the characteristic curve is gently wavy. This is due to the interference which is caused owing to the number of layers (for instance fifteen or sixteen layers) forming the dichroic film.

The conventional trichromatic resolution optical prism is constructed as described above. In the case where the prism is made of glass, a high-precision polishing process is required in order to flatten the total reflection surfaces and the dichroic-film-deposition surfaces thereof When it is required to provide a large trichromatic resolution optical prism, for instance, for a projection TV set, the sides of the resultant optical prism will be at least 70 mm long in the case where a 5-inch cathode ray tube is employed, and therefore the optical prism is large in weight, and high both in material cost and in machining costs such as for vacuum deposition and polishing.

On the other hand, dichroic mirror forming techniques using multi-layer vacuum deposition are not yet sufficiently developed. Therefore, when it is required to form an optical prism using plastic, it is considerably difficult to do so, and surface flatness cannot be improved without an additional machining operation.

In the case where, as shown in FIG. 4, the dichroic mirrors cross each other, the incident angle of the light beam to the dichroic mirror should be smaller than 45° even when the light beam is near the center of the mirror. However, as the incident point of the light beam shifts from the center of the mirror, the incident angle is changed, and the light beam reflected by the dichroic film is decreased in intensity Therefore, when the light beam reaches the screen, color shading takes place around the incident point.

SUMMARY OF THE INVENTION

An object of this invention is to eliminate the above-described difficulties.

More specifically, an object of the invention is to provide an optical prism of small weight, low manufacturing cost, and large size, in which, according to one aspect of the invention, a base block of glass or plastic or liquid material in the form of a prism is optically coupled to a plate-shaped member such as a glass plate, or a die-cast base block is filled with liquid material and fixedly combined with a plate-shaped member such as a glass plate, and a total reflection surface or dichroic mirror surface is formed on the plate-shaped member.

Another object of the invention is to provide a projection television set in which, according to another aspect of the invention, trichromatic composition optical prism means made up of the above-described optical prisms is so arranged that red, blue and green light beams are projected on a screen through a lens group with a small incident angle to the dichroic mirror and with the optical axes of the three light beams coincided.

DETAILED DESCRIPTION OF THE PREFERRED EMBODIMENTS

One embodiment of this invention will be described with reference to the accompanying drawings.

Figure 1:
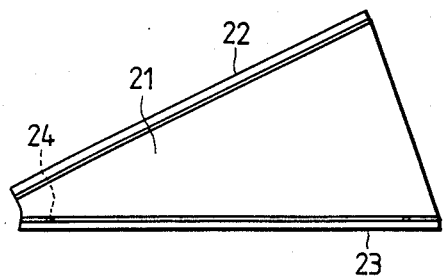
FIG. 1 is a sectional view showing an optical prism according to one aspect of the invention.

In FIG. 1, reference numeral 21 designates a base block of a prism, which is made of a glass material, or which, for the purpose of reduction of the weight, is made of a transparent plastic material formed by molding PMMA (methacrylic resin) or PS (polystyrene); 22, a glass plate forming a total reflection surface which totally reflects a light beam incident thereto at more than a certain critical angle; 23, a glass plate having a dichroic film vacuum-deposited on the side which confronts the base block 21; and 24, small spacers. The base block 21, the glass plate 22 and the glass plate 23 are optically coupled with a silicone gel.

Figure 2:
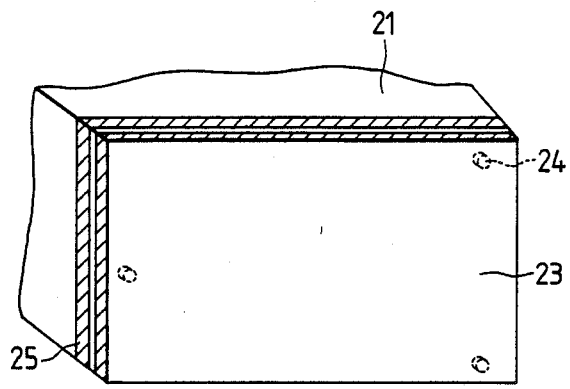
FIG. 2 is a perspective view showing a part of the optical prism illustrated in FIG. 1.

FIG. 2 shows a method of assembling the base block 21 and the glass plate 23, on one side of which the dichroic film has been formed. First, the spacers 24 are bonded to the base block 21, and then the glass plate 23 is bonded to the spacers 24. Under this condition, tape 25 is wound around the base block 21 and the glass plate 23 in such a manner that the space formed between the base block 21 and the glass plate 23 is enclosed by the tape 25. Thereafter, the space is filled with potting gel, which is then allowed to gel.

Figure 3:
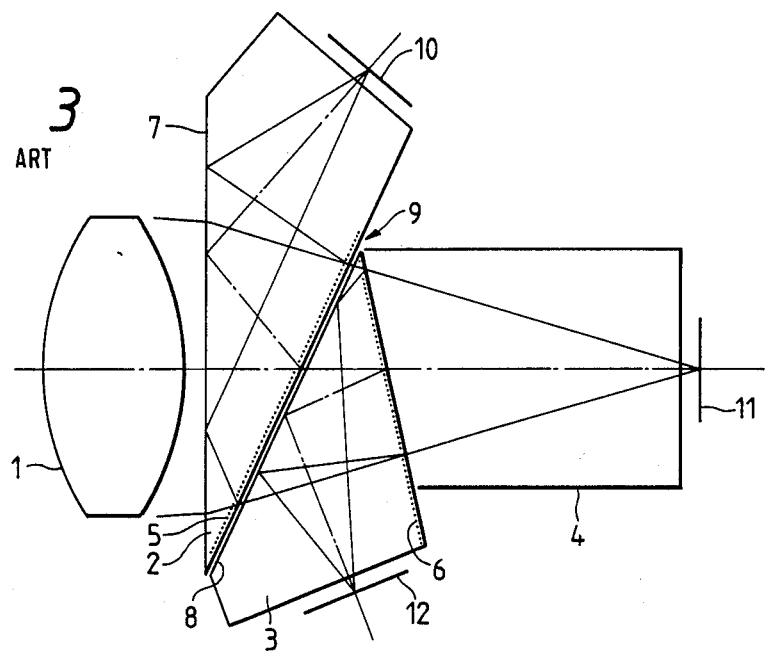
FIG. 3 is a sectional view showing the arrangement of a conventional trichromatic resolution optical prism means.
Figure 4:
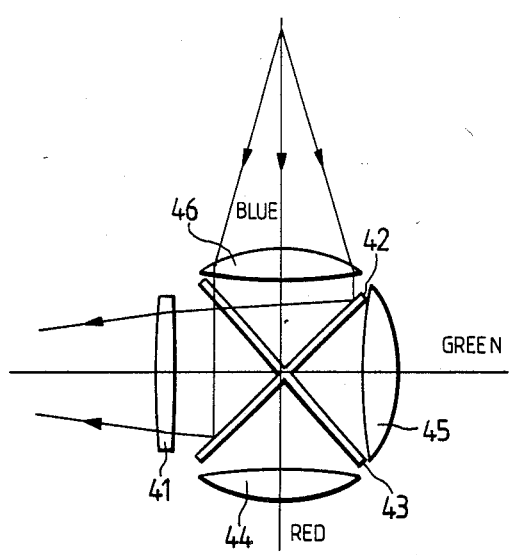
FIG. 4 is an explanatory diagram showing the arrangement of a conventional trichromatic composition optical system.
Figure 5:
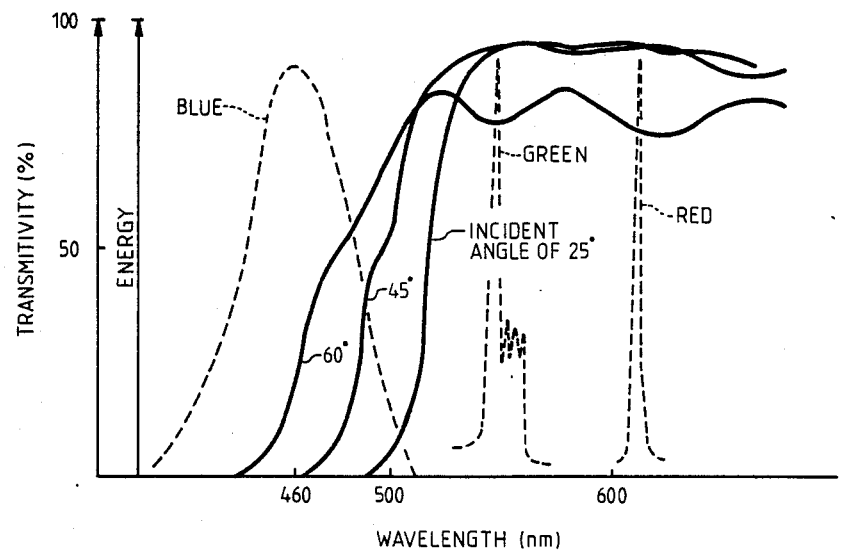
FIG. 5 is a graphical representation indicating the distribution of energy radiated by red, green and blue electron guns, and the variation in transmissivity of a dichroic mirror with respect to a blue light beam.

The prism thus formed can be utilized in a trichromatic resolution prism means. For instance, prisms of the invention can be used as the prisms 2 and 3 in FIG. 3. In this case, the optical paths of the light beams therein are similar to those in FIG. 3. When the trichromatic resolution prism means thus formed is employed for a projection TV set, the cathode ray tubes should be positioned at the image-forming surfaces 10, 11 and 12, respectively. In this case, the light beams emitted from the cathode ray tubes travel along the above-described optical paths reversely, thus emerging from the lens 1. The emergent light beams from the lens 1 are projected through a reflecting mirror (not shown) onto a projection screen (not shown).

One example of a projection TV set having the above-described prism means, the base blocks of which are of liquid material will be described with reference to FIG. 6.

Figure 6:
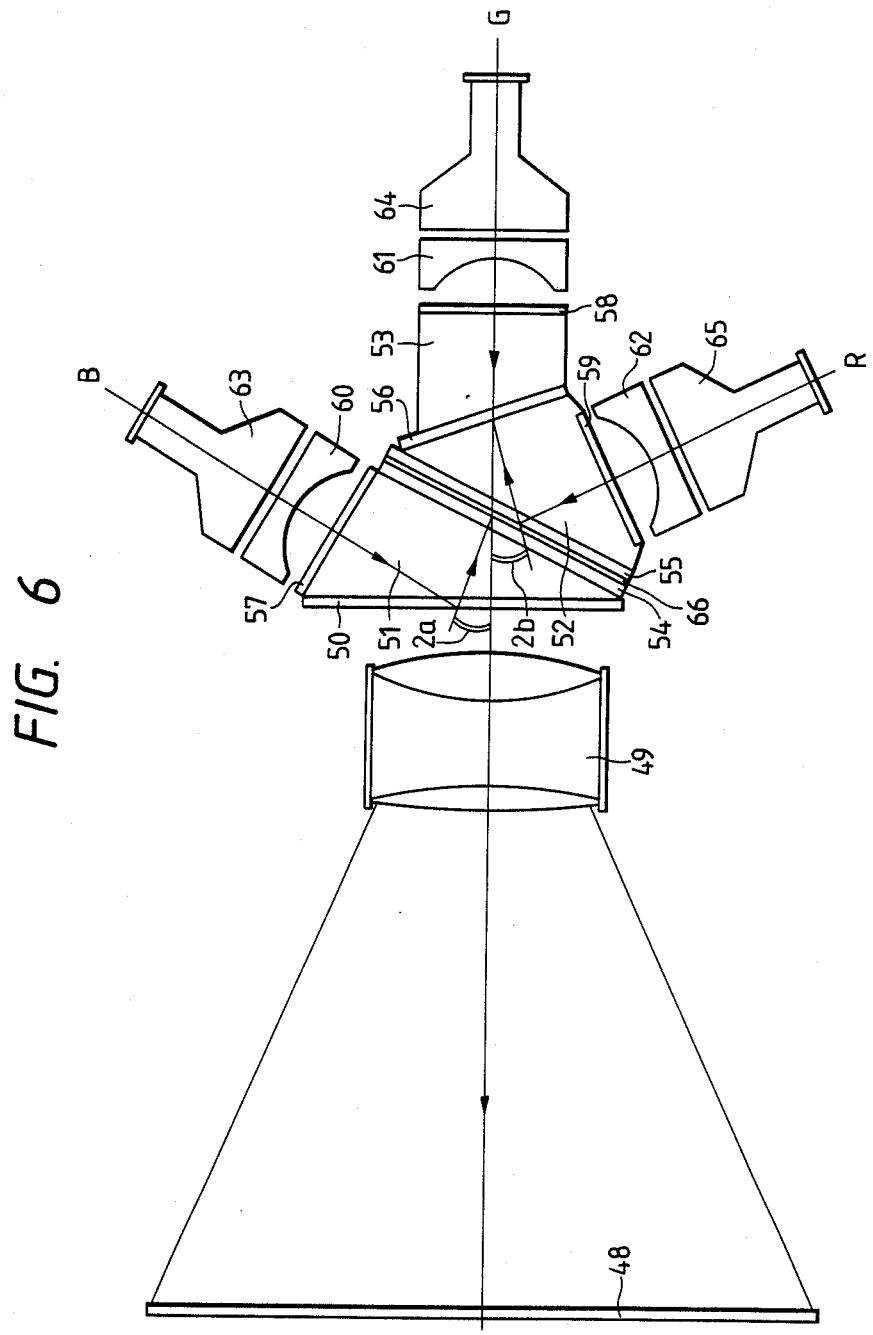
FIG. 6 is an explanatory diagram showing the arrangement of a projection TV set which is provided according to another aspect of the invention.

In FIG. 6, reference numeral 48 designates a projecting screen; 49, a lens group for focusing red, green and blue light beams whose optical axes coincide with one another on the screen 48 with the picture enlarged; 50, a plate-shaped member functioning as a total reflection surface to reflect all colors of light, the member 50 being so arranged that the incident angle of the blue light beam is more than the critical angle; 51, a liquid material having a refractive index of 1.4 to 1.6 such as a 100% glycerol solution, and mixtures of glycerol and ethylene glycol, such as a mixture of 70% glycerol and 30% ethylene glycol by weight, or a mixture of 25% glycerol and 75% ethylene glycol by weight; 52 and 53, liquid materials similar to the above-described liquid material 51; 54, a plate-shaped member having a dichroic mirror which transmits red and green light and reflects blue light in such a manner that the optical axis of the blue light beam is coincided with those of the red and green light beams; 55, a plate-shaped member functioning as a total reflection surface to reflect all colors of light, the member 55 being so arranged that the incident angle of the red light beam is larger than the critical angle; 56, a plate-shaped member having a dichroic mirror which transmits green light and reflects red light in such a manner that the optical axis of the red light beam is coincided with that of the green light; 57, 58 and 59, transparent plates of glass or plastic which may be provided with color filters; 60, 61 and 62, concave lenses interposed between blue, green and red electron guns 63, 64 and 65 and the transparent plates 57, 58 and 59, respectively, the blue, green and red electron guns 63, 64 and 65 emitting blue, green and red light beams, respectively; and 66, an air gap effective to allow total reflection of the red light beam. The air gap 66 is formed between the plate-shaped members 54 and 55. In the formation of the air gap, the method of pouring potting gel, described with reference to FIG. 2, is not employed. The liquid materials 51, 52 and 53 are injected into prism cases combined with the plate-shaped members 50, 54, 55 and 56, respectively. The prism cases are formed by die-casting metal or are made of plastic.

A blue light beam emitted from the blue electron gun 63 is applied through the concave lens 60, the transparent plate 57 and the liquid material 51 to the plate-shaped member 50 with the incident angle smaller than the critical angle. Therefore, the blue light beam is totally reflected by the plate-shaped member 50. The blue light beam thus reflected is allowed to advance through the liquid material 51 and is reflected by the plate-shaped member 54 (the incident angle being a). The blue light beam thus reflected is applied through the liquid material 51, the plate-shaped member 50 and the lens group 49 to the projecting screen 4, where it is focused with the picture enlarged.

On the other hand, a red light beam emitted from the red electron gun 65 is applied through the concave lens 62, the transparent plate 59, the liquid material 52, to plate-shaped member 55 and through the liquid material 52 to the plate-shaped member 56 having the dichroic mirror (the incident angle being b), where it is reflected. The red light beam thus reflected, passing through the liquid material 52, the plate-shaped member 55, the air gap 66, the plate-shaped member 54, the liquid material 51 and the plate-shaped member 50, is projected onto the screen 48 by means of the lens group 49 with the optical axis thereof coincided with that of the blue light beam.

A green light beam emitted from the green electron gun is projected onto the screen 48 without being reflected.

The liquid material injecting method and the prism structure are not limited to those which have been described above. It goes without saying that the arrangement and the size of the screen and the lens group may be modified in various manners without departing from the spirit of the invention.

The flatness of the total reflection surface and the dichroic mirror surface of each prism depends on that of the glass plates attached to the base block. Therefore, the base block itself need not be so high in accuracy (for instance the accuracy of the mirror reflection angle of each surface may be of the order of ±5 minutes). Accordingly, the base block may be formed by molding a plastic material; that is, a base block of small weight and low manufacturing cost can be used.

Furthermore, the base block is formed using the liquid material according to the invention. In this case, when compared with a base block of plastic, the base block of liquid material has a fewer number of parts to be molded and less limitations in configuration. In the case where the base block is formed using the mixture solution, the refractive index is high in degree of freedom; that is, it can be freely selected by changing the mixing ratio. On the other hand, in the case where the ambient temperature increases, the prisms can be uniformly cooled, and therefore the difficulty that the refractive index may be affected by the fluctuation of the optical path is eliminated.

The liquid material is electrically conductive. Therefore, the prism according to the invention is free from the difficulty of dust adhesion because of static electricity. In addition, the liquid prism is much lower in manufacturing cost than a glass or plastic prism.

The dichroic mirror surface is formed by vacuum-depositing dichroic films in a multi-layer form; however, it should be noted that the dichroic mirror surface is formed on a glass plate (flat plate) instead of a base block. This allows the dichroic mirror surface to be readily formed.

The plate-shaped members, namely, the glass plates, may be made of float glass. Therefore, the glass plates are high in flatness. This means that it is unnecessary to provide a polishing step in the manufacture of the glass plate. That is, the glass plate can be readily manufactured.

The base block is optically coupled to the glass plate according to the invention. Therefore, the prism means provided according to the invention is lower in optical loss, and minimizes the adverse optical effects (reflection and dispersion of light beams) which may be caused when the base block is merely bonded to the glass plate.

The red, green and blue light beams are projected onto the screen with the optical axes thereof coincided with one another. Therefore, no color-shifting phenomenon occurs on the screen, and the difficulty where the image is reddish or bluish at the periphery is eliminated. In addition, white uniformity and color uniformity can be maintained high. Furthermore, even when the screen is somewhat displaced because the projection TV set is large, convergence is maintained unchanged. As was described above, the optical axes of the red, green and blue light beams are coincided with one another. Therefore, when a black strip treatment is given to the screen, the black print screen area degree, which is generally less than 40%, can be made larger. As a result, the image formed is high in contrast, and it is clear even when the screen is set in a light room.

Since the red, green and blue light beams are applied to the screen with their optical axes coincided, screens of different size can be used merely by changing the magnification of the lens group. Accordingly, it is unnecessary to readjust the convergence.

With the trichromatic composition prism means, the incident angles of the blue and red light beams to the dichroic mirror is made smaller. Therefore, the blue light beam especially is reflected therefrom with its energy distribution unaffected, and accordingly the color shading phenomenon on the projection screen can be substantially eliminated.

What is claimed is:

1. An optical prism comprising:
   a base member (21) in the form of a prism having a total reflection surface (22) formed at a first surface thereof;
   a plate-shaped member (23) having a dichroic film formed on a surface thereof which is optically coupled to said base member; and
   means for fixing said plate-shaped member to said prism at a position proximate to said base member with said dichroic film confronting a second surface of said base member and wherein said prism forming said base member includes another plate-shaped member (22) at said second surface to form said total reflection surface.

2. An optical prism as claimed in claim 1, wherein said prism forming said base member is solid.

3. An optical prism as claimed in claim 1, wherein said prism forming said base member further comprises a liquid material disposed between said plate-shaped member of said prism and said another plate-shaped member disposed proximate said base member.

4. An optical prism as claimed in claim 1, wherein each of said plate-shaped members comprises one of glass and plastic.

5. An optical prism as claimed in claim 2, wherein said means for fixing fixes said plate-shaped member (23) at the position confronting said second surface of said base member with a space between said second surface and said plate-shaped member (23) and optical coupling is performed by means for optically coupling said plate-shaped member (23) to said second surface of said base member.

6. An optical prism as claimed in claim 2, wherein said base member is a molding of a transparent plastic including one of PMMA (methacrylic resin) and PS (polystyrene).

7. An optical prism as claimed in claim 2, wherein said base member is a molding of glass.

8. An optical prism as claimed in claim 3, wherein said liquid material is one of glycerol, and a mixture of glycerol and ethylene glycol.

9. A projection television set as claimed in claim 2, wherein said base member and said plate-shaped member are optically coupled using a potting gel.

10. A projection television set of the type having red, blue and green electron guns for emitting red, blue and green light beams, respectively, with differing optical axes, said television set further comprising:
   a screen;
   trichromatic composition prism means for receiving said light beams and projecting them onto said screen with said optical axes coincided, said prism means comprising three prism members, two of said prism members comprising:
   a base member in the form of a prism having a total reflection surface formed at a first surface thereof;
   a plate-shaped member having a dichroic film formed thereon on a surface of said plate-shaped member optically coupled to said base member; and
   means for fixing said plate-shaped member to said prism at a position proximate to said base member with said dichroic film confronting a second surface of said base member.

11. A projection television set as claimed in claim 10, wherein a first prism of said two prisms is optically coupled at one end thereof to said dichroic film, and a second prism of said two prisms has a first total reflection surface coupled to a first side thereof and said dichroic film of said first prism is coupled to a second side thereof, and a third prism of said three prism members having a dichroic mirror coupled to a first side thereof, and a second total reflection mirror coupled to a second side thereof, said dichroic mirror being spaced from said first total reflection surface by an air gap.

12. A projection television set of the type set forth in claim 17, wherein said prism forming said base member is solid.

13. An optical prism as claimed in claim 12, wherein said means for fixing fixes said plate-shaped member at the position confronting said second surface of said base member with a space between said second surface and said plate-shaped member and optical coupling is performed by means for optically coupling said plate-shaped member to said second surface of said base member.

14. An optical prism as claimed in claim 10, wherein said prism forming said base member includes another plate-shaped member at said second surface to form said total reflection surface.

15. An optical prism as claimed in claim 14, wherein said prism forming said base member further comprises a liquid material disposed between said plate-shaped member of said prism and said another plate-shaped member disposed proximate said base member.

16. An optical prism as claimed in claim 14, wherein said of said plate-shaped members comprise one of glass and plastic.

17. A projection television set as claimed in claim 15, wherein said liquid material is one of glycerol, and a mixture of glycerol and ethylene glycol.

* * * * *